(12) United States Patent
Rockwell et al.

(10) Patent No.: US 9,246,303 B1
(45) Date of Patent: Jan. 26, 2016

(54) METHOD AND APPARATUS FOR TEMPORALLY CONCENTRATING PUMP POWER TO SUPPORT GENERATION OF HIGH PEAK-POWER PULSE BURSTS OR OTHER TIME-VARYING LASER OUTPUT WAVEFORMS

(71) Applicant: Raytheon Company, Waltham, MA (US)

(72) Inventors: David A. Rockwell, Culver City, CA (US); Vladimir V. Shkunov, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/530,590

(22) Filed: Oct. 31, 2014

(51) Int. Cl.
| | | |
|---|---|---|
| *H01S 3/094* | (2006.01) | |
| *H01S 3/23* | (2006.01) | |
| *H01S 3/115* | (2006.01) | |
| *H01S 3/13* | (2006.01) | |
| *H01S 3/067* | (2006.01) | |
| *H01S 3/10* | (2006.01) | |

(52) U.S. Cl.
CPC .......... *H01S 3/2333* (2013.01); *H01S 3/06754* (2013.01); *H01S 3/094023* (2013.01); *H01S 3/10* (2013.01); *H01S 3/10007* (2013.01); *H01S 3/115* (2013.01); *H01S 3/1305* (2013.01); *H01S 2301/02* (2013.01)

(58) Field of Classification Search
CPC ..... H01S 3/063; H01S 3/067; H01S 3/06712; H01S 3/06754; H01S 3/09; H01S 3/091; H01S 3/094; H01S 3/0941; H01S 3/10; H01S 3/10007; H01S 3/10069; H01S 3/107; H01S 2301/02; H01S 3/2333; H01S 3/094023; H01S 3/115; H01S 3/1305

See application file for complete search history.

(56) References Cited

U.S. PATENT DOCUMENTS

| | | | | |
|---|---|---|---|---|
| 5,694,408 | A * | 12/1997 | Bott et al. ...................... | 372/6 |
| 5,748,655 | A | 5/1998 | Yessik et al. | |
| 7,667,889 | B2 | 2/2010 | Murison et al. | |
| 2011/0182306 | A1 | 7/2011 | Hosseini et al. | |

OTHER PUBLICATIONS

F. J. Grawert et al., "Automatic feedback control of an Er-doped Fiber laser with an intracavity loss modulator", Optics Letters/vol. 30, No. 9/May 1, 2005, 3 pages.
Evgeny M. Dianov, "Amplification in Extended Transmission Bands Using Bismuth-Doped Optical Fibers", Journal of Lightwave Technology, vol. 31, No. 4/ Feb. 15, 2013, 8 pages.
Ee-Leong Lim, et al., "Optimizing the pumping configuration for the power scaling of in-band pumped erbium doped fiber amplifiers", Optics Express 13886, vol. 20, No. 13, Jun. 18, 2012, 10 pages.

* cited by examiner

*Primary Examiner* — Armando Rodriguez

(57) ABSTRACT

A method includes accumulating optical pump power in a first laser gain medium during a first period of time, where the first laser gain medium is optically located within a resonator. The method also includes providing at least some of the accumulated optical pump power as a first laser output with a feedback-controlled waveform from the first laser gain medium to a second laser gain medium during a second period of time, where the second period of time is substantially shorter than the first period of time. The method further includes generating a second laser output having a burst of laser pulses using the second laser gain medium as a power amplifier. The first and second laser outputs have higher power levels during the second period of time compared to a power level of the optical pump power during the first period of time.

23 Claims, 4 Drawing Sheets

METHOD AND APPARATUS FOR TEMPORALLY CONCENTRATING PUMP POWER TO SUPPORT GENERATION OF HIGH PEAK-POWER PULSE BURSTS OR OTHER TIME-VARYING LASER OUTPUT WAVEFORMS

TECHNICAL FIELD

This disclosure is directed in general to laser systems. More specifically, this disclosure is directed to a method and apparatus for temporally concentrating pump power to support the generation of high peak-power pulse bursts or other time-varying laser output waveforms.

BACKGROUND

Various systems use lasers to generate rapid sequences of laser pulses. These rapid sequences of laser pulses are often described as having a "pulse burst" waveform. As an example, some conventional high-performance laser detection and ranging (LADAR) systems may require transmitters that can generate a rapid sequence of short high peak-power laser pulses followed by a period having no pulses, where this on-off pattern is repeated periodically. Such transmitters are often pumped using low average-power light sources, such as laser diodes. To achieve this burst mode, lasers would typically require a very high pump-power level during the pulse burst. Rough estimates for a representative pulse-burst format show that the pump power during the burst could easily reach 20 kW or more, which is comparable to power levels that might be produced by low-end high-energy laser (HEL) systems. Unfortunately, even low-end HEL systems are often unable to satisfy size, weight, power, and cost (SWaP-C) requirements in various applications.

SUMMARY

This disclosure provides a method and apparatus for temporally concentrating laser pump power, such as continuous wave (CW) or quasi-continuous wave (QCW) pump power, into much higher peak-power pump pulses to support the generation of high peak-power pulse bursts or other laser output waveforms.

In a first embodiment, a method includes accumulating optical pump power in a first laser gain medium during a first period of time, where the first laser gain medium is optically located within a resonator. The method also includes providing at least some of the accumulated optical pump power as a first laser output with a feedback-controlled waveform from the first laser gain medium to a second laser gain medium during a second period of time, where the second period of time is substantially shorter than the first period of time. The method further includes generating a second laser output having a burst of laser pulses using the second laser gain medium as a power amplifier. The first and second laser outputs have higher power levels during the second period of time compared to a power level of the optical pump power during the first period of time.

In a second embodiment, an apparatus includes a pump temporal concentrator having a first laser gain medium optically located within a resonator. The first laser gain medium is configured to accumulate optical pump power during a first period of time. The apparatus also includes a power amplifier having a second laser gain medium. The pump temporal concentrator is configured to provide at least some of the accumulated optical pump power as a first laser output with a feedback-controlled waveform from the first laser gain medium to the second laser gain medium during a second period of time that is substantially shorter than the first period of time. The power amplifier is configured to generate a second laser output having a burst of laser pulses. The first and second laser outputs have higher power levels during the second period of time compared to a power level of the optical pump power during the first period of time.

In a third embodiment, a system includes a laser transmitter having an optical pump, a pump temporal concentrator, and a power amplifier. The optical pump is configured to generate optical pump power. The pump temporal concentrator includes a first laser gain medium optically located within a resonator. The first laser gain medium is configured to accumulate the optical pump power during a first period of time. The power amplifier includes a second laser gain medium. The pump temporal concentrator is configured to provide at least some of the accumulated optical pump power as a first laser output with a feedback-controlled waveform from the first laser gain medium to the second laser gain medium during a second period of time that is substantially shorter than the first period of time. The power amplifier is configured to generate a second laser output having a burst of laser pulses. The first and second laser outputs have higher power levels during the second period of time compared to a power level of the optical pump power during the first period of time.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
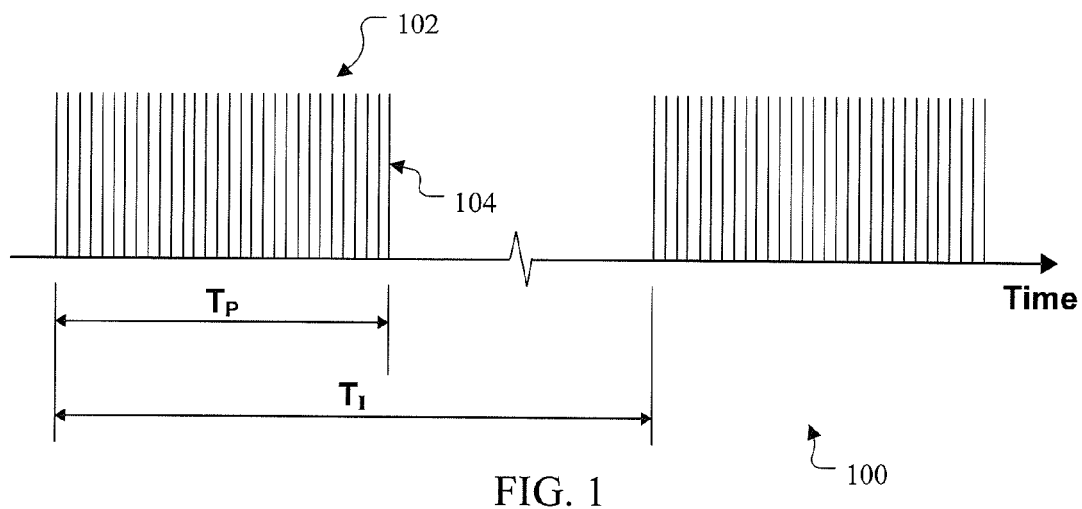
FIG. 1 illustrates an example pulse-burst waveform for a laser system according to this disclosure.

FIG. 1 illustrates an example pulse-burst waveform 100 for a laser system according to this disclosure. As shown in FIG. 1, the pulse-burst waveform 100 includes multiple bursts 102, where each burst 102 includes multiple laser pulses 104. Any number of laser pulses 104 could occur within each burst 102, and the laser pulses 104 could have any suitable energy level. In some embodiments, the laser pulses 104 in each burst 102 could have substantially the same energy level. In this example, the pulses 104 within each burst 102 occur during a specified time period $T_P$. Also, the bursts 102 within the waveform 100 occur at a specified time interval $T_1$.

As described below, a laser system uses a pump temporal concentrator that can (among other things) support the generation of bursts 102 of laser pulses 104 having high peak-power levels using one or more low-power pump sources. The pump temporal concentrator stores pump power in an optical capacitor over longer periods of time and releases the stored pump power from the optical capacitor over shorter periods of time, such as during the bursts 102. The optical capacitor represents a laser gain medium in a laser resonator. By storing and releasing pump power using the optical capacitor, the laser system could implement the pulse-burst waveform 100 shown in FIG. 1 while satisfying applicable size, weight, power, and cost (SWaP-C) requirements in various applications and while using low-power pump sources.

In some applications such as advanced laser detection and ranging (LADAR) systems, a transmitter may need to generate a sequence of high peak-power laser pulses and provide waveform diversity to ensure that the systems can be optimized for a broad range of applications and operational conditions. As a particular example, a transmitter may need to generate a sequence of high peak-power laser pulses 104 having a combined power of about 5 kW to 10 kW in each burst 102. To accomplish this, the pulse-burst waveform 100 could have about thirty laser pulses 104 per burst 102, where the laser pulses 104 have a duration of about 1 ns, an energy level of about 5 mJ to about 10 mJ per pulse, and a pulse repetition frequency of about 1 MHz. In this particular implementation, the time period $T_P$ for each burst 102 would be about 30 µs. The bursts 102 could also have a repetition rate of about 500 Hz, so the time interval $T_1$ between consecutive bursts 102 would be about 2 ms. One challenge in this type of application involves generating adequate power using a pump laser to reach the desired combined power and pulse energy levels. For instance, assuming a 50% optical efficiency, about 10 kW of pump power would be needed to store 10 mJ every 1 µs, which would yield 5 mJ pulses spaced by 1 µs. The laser system described below is capable of meeting these particular specifications for the pulse-burst waveform 100.

Note that the specific values given above are examples only. In general, the laser system described below could support the generation of a laser output by concentrating pump power during longer periods of time and releasing the concentrated pump power during shorter periods of time. In some embodiments, the laser system described below could operate at an eye-safe wavelength, such as about 1.5 µm or about 2.0 µm.

Although FIG. 1 illustrates one example of a pulse-burst waveform 100 for a laser system, various changes may be made to FIG. 1. For example, the number of pulses 104 per burst 102, the total duration of each burst 102, and the interval between bursts 102 could vary according to particular needs. Also, these values need not be constant within the same pulse-burst waveform 100.

Figure 2:
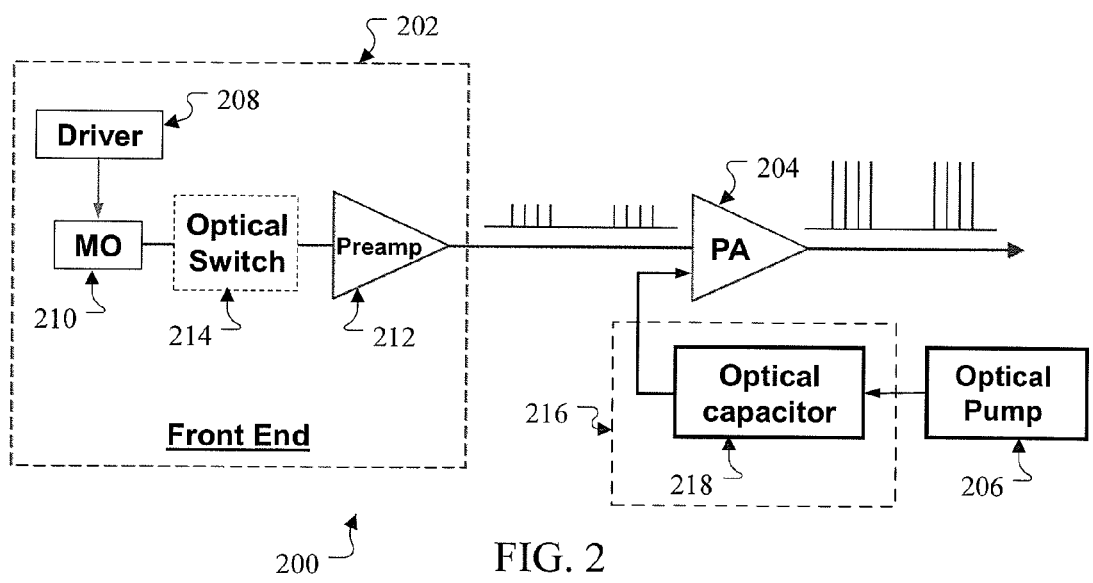
FIGS. 2 through 4 illustrate an example laser system for generating bursts of high peak-power laser pulses or other laser outputs according to this disclosure.
Figure 3A:
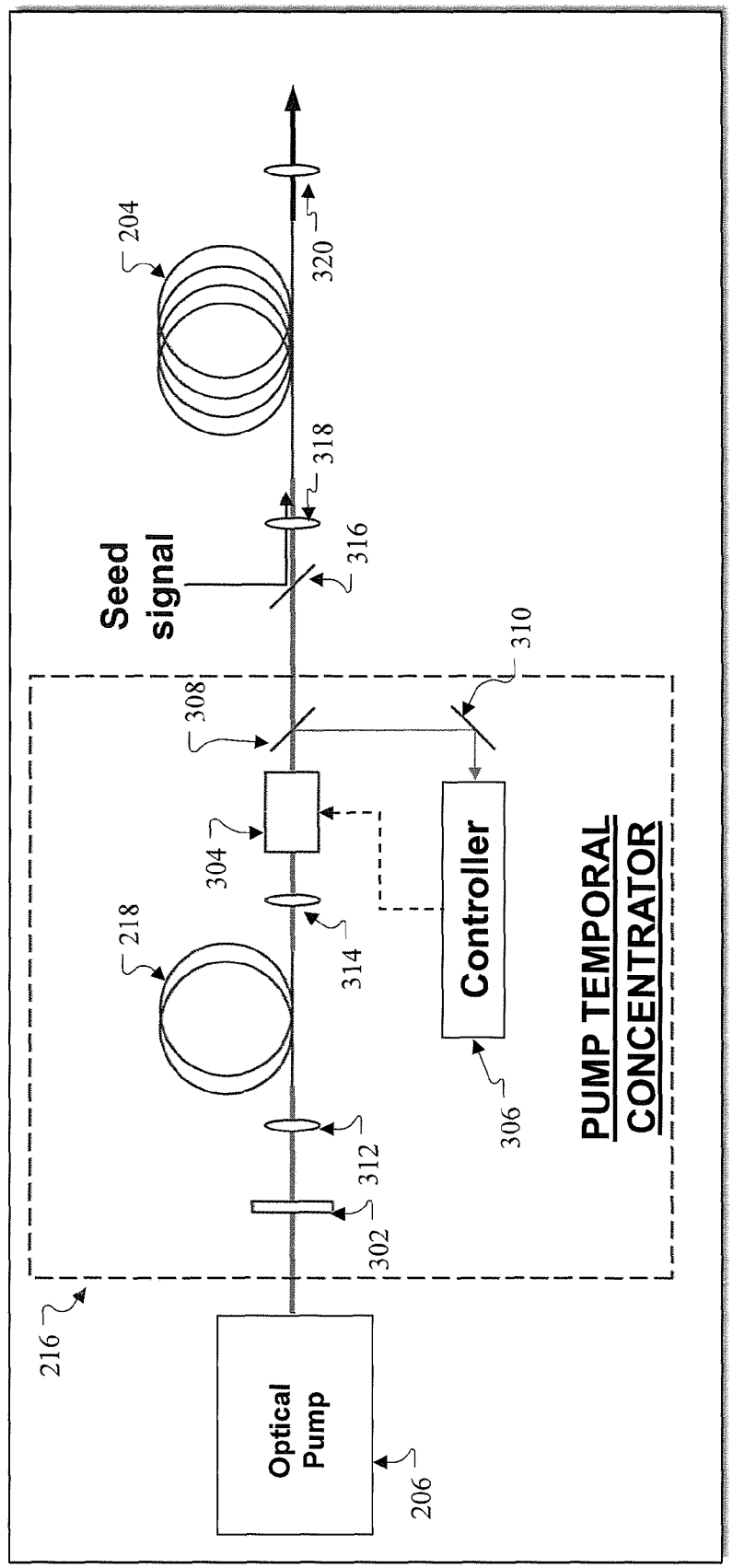
Figure 3B:
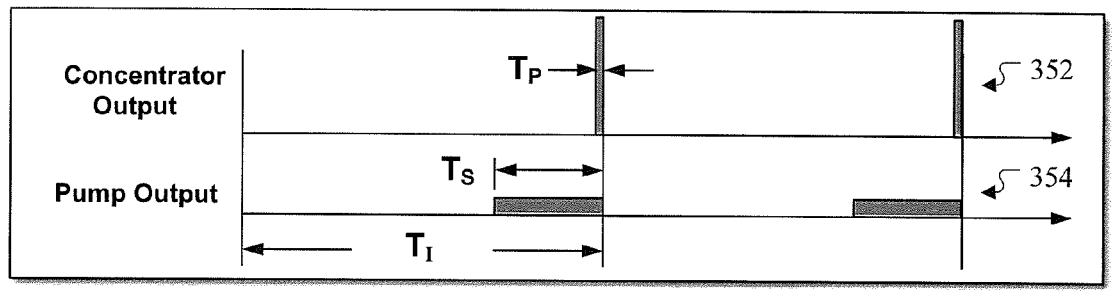
Figure 4:
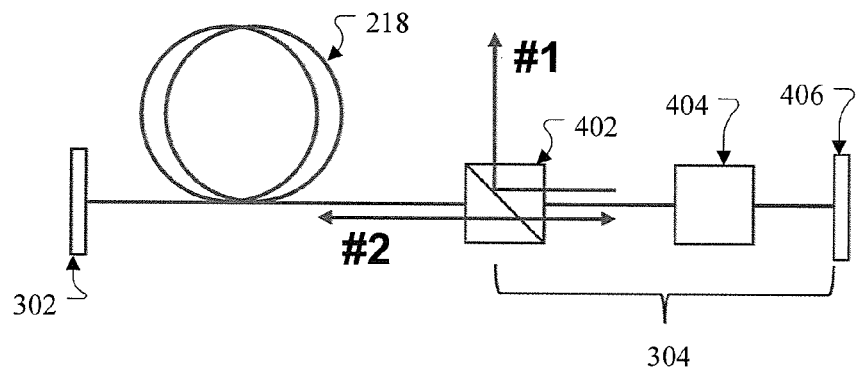

FIGS. 2 through 4 illustrate an example laser system for generating bursts of high peak-power laser pulses or other laser outputs according to this disclosure. As shown in FIG. 2, a laser system 200 uses a master oscillator power amplifier (MOPA) configuration, which supports the generation of high peak-power laser pulses. This configuration includes a front end 202, which includes components that generate a low-power version of the desired output waveform. The low-power version is referred to as a "seed signal" and is provided to a power amplifier (PA) 204. The power amplifier 204 operates in conjunction with an optical pump 206, which pumps laser energy into the power amplifier 204, to generate high peak-power laser pulses.

The front end 202 in this example includes a driver 208, which drives and controls a master oscillator (MO) 210. The master oscillator 210 generates an output signal based on input from the driver 208. In some embodiments, the master oscillator 210 is implemented using at least one semiconductor diode laser, and the master oscillator 210 determines its output waveform(s) depending on the input received from the driver 208. The output of the master oscillator 210 could form a continuous pulse train (CPT), a pulse burst, or any of various other waveforms. The output of the master oscillator 210 is provided to one or more preamplifiers 212, which amplify the signal to create the seed signal that is launched into the power amplifier 204. If a continuous pulse train is produced by the master oscillator 210, an optical switch 214 can be used to select a burst of pulses from the continuous pulse train for output to the preamplifier(s) 212, while remaining pulses from the continuous pulse train are blocked from reaching the preamplifier(s) 212. As an alternative, one could vary the temporal waveform of the driver 208 such that the driver 208 directly causes the master oscillator 210 to produce a burst of pulses, in which case the optical switch 214 is not required. In some embodiments, the output of the preamplifier(s) 212 could have the same shape (but not the desired power level) of the pulse-burst waveform 100 shown in FIG. 1.

The driver 208 includes any suitable structure for driving and controlling an output of a seed signal generator. The master oscillator 210 includes any suitable structure for generating an optical signal, such as one or more laser diodes. Each preamplifier 212 includes any suitable structure for amplifying an optical signal. The optical switch 214 includes any suitable structure for selectively outputting or blocking an optical signal.

The power amplifier 204 generates an amplified laser output based on the seed signal received from the front end 202 and pump energy received from the optical pump 206. The amplified laser output has higher-amplitude pulses compared to the seed signal. The power amplifier 204 includes any suitable structure for amplifying optical signals, such as a semi-guiding high-aspect-ratio core (SHARC) fiber power amplifier or a planar waveguide (PWG) amplifier. Various types of power amplifiers 204 could be employed in this architecture. Whatever type of power amplifier 204 is used, the power amplifier 204 has the capacity to generate the peak and average powers required by a specific application of interest. As a particular example, the power amplifier 204 could be implemented using a fiber amplifier with high efficiency, good beam quality, and desirable size, weight, and power (SWaP) characteristics.

When selecting the design of a power amplifier 204, various potential nonlinear optical effects of the amplifier 204 can be considered depending on the nature of the amplifier 204 and the application. Assuming the power amplifier 204 is capable of generating a single pulse having the required peak-power, its nonlinear optical effects are generally no worse for a pulse burst than for a continuous pulse train of the same pulses. This assumption is typically valid as long as the inter-pulse period within the burst is much longer than a Brillouin lifetime in the laser medium. If this condition is not met, stimulated Brillouin scattering (SBS) could actually become more problematic for burst pulses than for isolated pulses. For fiber lasers, the Brillouin lifetime is rather short (such as about 20 ns for some fiber lasers), so the assumption is valid with significant margin.

One challenge that arises when using the laser system 200 to generate high peak-power pulses is the ability to provide sufficient pump power to the power amplifier 204 in order to generate the pulses within a short time interval corresponding to the time $T_P$. In the example given above with respect to FIG. 1, for instance, the laser system 200 would need to generate thirty laser pulses 104 within a 30 μs burst 102, where each pulse 104 has a duration of about 1 ns and an energy level of about 5 mJ to about 10 mJ. This is much harder to accomplish than generating a single pulse within a longer time interval of, for example, 50 to 100 μs for a CPT waveform. Another challenge that arises is satisfying size, weight, power, and cost (SWaP-C) requirements for a transmitter that incorporates the laser system 200. For example, LADAR systems often have very severe size/weight/power constraints on the platforms in which the LADAR systems are deployed.

One possible approach to solving these challenges involves storing the total energy of the complete pulse burst 102 in a single power amplifier 204 and then arranging for individual pulses 104 to sequentially extract (and deplete) the stored energy from the power amplifier 204. However, such dense energy storage inevitably leads to optical loss associated with amplified stimulated emission (ASE). Besides that, increasing the amount of stored energy in a power amplifier 204 typically necessitates a corresponding increase in the total size/volume of the amplifier. This can be problematic in various situations, such as if efficient operation of a laser requires a small cross-sectional area, if amplifier lengths cannot be arbitrarily long (due to ASE or nonlinear effects), or if the amplifier needs to produce a good beam quality. Moreover, because the stored energy is depleted during a burst 102, each successive pulse 104 in the burst 102 has a lower gain than the preceding pulses 104, and the cumulative gain reduction can be quite large. It is possible to "pre-warp" the seed signal by the front end 202 before the seed signal is injected into the power amplifier 204 such that each successive pulse 104 has more energy than the preceding pulses 104 in a burst 102. If this systematic variation in the seed energy is optimized, it is possible in principle to neutralize the impact of the systematic gain reduction during the sequence of pulses 104. However, it is difficult to compensate for the gain reduction in this manner while maintaining good extraction efficiency throughout the burst 102.

Another possible approach to solving these challenges involves providing enough pump power so that the power amplifier 204 essentially maintains a constant inversion (and stored energy) throughout an entire pulse burst 102, meaning the energy extracted by one pulse 104 is replaced by the optical pump 206 during the time between pulses 104 in the burst 102. In this case, the power amplifier 204 only needs to store enough energy for a single pulse 104. A brute-force example of this approach is to increase the total number of pump diodes in the optical pump 206. However, in order to obtain adequate pump powers, a large number of laser diodes would be needed in the optical pump 206, which creates SWaP-C problems.

In accordance with this disclosure, a pump temporal concentrator 216 including an optical capacitor 218 is inserted between the optical pump 206 and the power amplifier 204. As described in more detail below, power generated by the optical pump 206 is stored in the optical capacitor 218 during longer periods of time, and the optical capacitor 218 radiates out the stored power into the power amplifier 204 during shorter periods of time (such as during pulse bursts 102). Effectively, the optical capacitor 218 helps to concentrate the power from the optical pump 206 into higher power levels for the power amplifier 204. Moreover, the optical capacitor 218 and the pump temporal concentrator 216 pump the power amplifier 204 to replace energy extracted from the power amplifier 204 by a single pulse 104 prior to the generation of the next pulse 104. This energy storage in the optical capacitor 218 allows a relatively low-power optical pump 206 to be used, such as an optical pump 206 containing a relatively low number of laser diodes. This may also not significantly increase the SWaP of the laser system 200, and the overall amplifier efficiency may be reduced only slightly if at all. The total duration of the output from the pump temporal concentrator 216 is substantially matched to the total length of the pulse burst 102, which helps to minimize any efficiency loss due to providing a pump beam for the power amplifier 204 when no seed signal is present.

The optical pump 206 includes any suitable structure for pumping laser power, such as one or more pump laser diodes. As a particular example, the optical pump 206 could include one or more quasi-continuous wave (CW) pump diodes, such as one or more Indium phosphide (InP) based laser diodes that operate at a nominal wavelength of about 1470 nm. The optical capacitor 218 includes any suitable laser medium for storing and releasing optical energy, such as a high-aspect-ratio core (HARC) fiber. As a particular example, the optical capacitor 218 could represent an Erbium (Er) doped gain medium.

An example implementation of the pump temporal concentrator 216 is shown in FIG. 3A, where it is assumed that the power amplifier 204 and the optical capacitor 218 are implemented using coiled optical fibers. Note, however, that power amplifiers and optical capacitors having other form factors or designs could also be used.

As shown in FIG. 3A, the optical pump 206 pumps optical power into the optical capacitor 218. The output from the optical pump 206 could have any suitable wavelength(s), such as one or more "eye safe" wavelengths. The optical capacitor 218 accumulates and stores the optical power, which can be roughly analogous to storing an electrical charge in an electrical capacitor. The optical capacitor 218 resides within an optical resonator that includes a first resonator mirror 302 and a programmable out-coupler 304, which is described below. The programmable out-coupler 304 controls the lasing dynamics of the resonator and selectively out-couples the stored optical power to the power amplifier 204.

A controller 306 controls the reflectivity of the programmable out-coupler 304 in order to direct pump power back to the optical capacitor 218 or to the power amplifier 204. For example, as described below, the programmable out-coupler 304 could include a beam splitter and a second resonator mirror. In a first mode of operation, the programmable out-coupler 304 allows essentially none of the optical signals to reflect back and forth between the first resonator mirror 302 and the second resonator mirror in the programmable out-coupler 304. In this first mode, the resonator has a very low Q and essentially no stimulated emission. In a second mode of operation, such as for each burst 102 of pulses 104, the controller 306 can issue a command to the programmable out-coupler 304 that causes the beam splitter in the programmable out-coupler 304 to allow optical signals to reflect back and forth between the first resonator mirror 302 and the second resonator mirror in the programmable out-coupler 304. In this second mode, the resonator has a higher Q and begins lasing at one or more specified wavelengths, such as about 1532 nm. This allows the controller 306, via the programmable out-coupler 304, to control when pump power is stored in the optical capacitor 218 and when the stored pump power is released to the power amplifier 204.

A sample of the output provided to the power amplifier 204 is fed back into the controller 306 via mirrors 308-310. The controller 306 can use the feedback to actively adjust the resonator in order to, for example, maintain a substantially constant output power propagating toward the power amplifier 204, maintain a substantially constant output power exiting the power amplifier 204, or obtaining any non-constant output power to or from the power amplifier 204 as needed or desired. The output of the optical capacitor 218 can therefore represent any suitable feedback-controlled waveform that achieves a desired output power of the laser system. The output of the optical capacitor 218 could even be modulated according to a specified protocol, such as by altering the interval(s) between or energy level(s) of the pulses in the bursts, to transmit information. The controller 306 could also vary the output power from the pump temporal concentrator 216 to vary the inter-pulse period within a burst 102 or the individual amplitudes of the pulses 104 in a specific temporal pattern. The controller 306 could allow the resonator to lase for a specified time period (such as about 30 µs), during which time the laser system 200 generates a burst 102 of pulses 104. Once that time period is completed, the controller 306 can issue a command to the programmable out-coupler 304 so that pump power is again stored in the optical capacitor 218.

Lenses 312-314 or other optical coupling mechanisms could be used to facilitate injection and reception of pump signals into and out of the optical capacitor 218. Also, a dichroic mirror 316 can be used to direct the output of the pump temporal concentrator 216 and the seed signal from the front end 202 into the power amplifier 204. A lens 318 can be used to facilitate injection of these signals into the power amplifier 204, and a lens 320 can be used to focus or otherwise optically modify an output of the power amplifier 204. The output of the power amplifier 204 could have any suitable wavelength(s), such as about 1570 nm.

The first resonator mirror 302 includes any suitable structure that receives laser energy traveling in one direction and reflects the laser energy so that it travels in another direction. The programmable out-coupler 304 includes any suitable structure having a programmable or controllable reflectivity. An example of the programmable out-coupler 304 is shown in FIG. 4, which is described below. The controller 306 includes any suitable structure for controlling operation of at least part of a laser system. For instance, the controller 306 could represent at least one microprocessor, microcontroller, digital signal processor, field programmable gate array (FPGA), application specific integrated circuit (ASIC), or discrete circuitry. The mirrors 308, 310, 316 include any suitable structures that are at least partially reflective. For example, the mirrors 308 and 316 could represent dichroic mirrors, and the mirror 310 could represent a regular mirror. The lenses 312-314, 318-320 include any suitable structures for focusing or otherwise modifying optical energy.

Example operations of the laser system 200 are shown in FIG. 3B, where a waveform 352 denotes the output of the pump temporal concentrator 216 and a waveform 354 denotes the output of the optical pump 206. As can be seen here, during at least a portion of the repeating time interval $T_1$, the optical pump 206 pumps laser power into the pump temporal concentrator 216 during a time period $T_S$. The pump temporal concentrator 216 concentrates and outputs this laser power during the shorter time period $T_P$, such as when a burst 102 of pulses 104 occurs. Also, the time periods $T_P$ and $T_S$ overlap here, indicating that the optical pump 206 is providing power to the optical capacitor 218 even as stored power is being removed from the optical capacitor 218. As a particular example, the time period $T_P$ could denote about 30 µs, the time period $T_S$ could denote about 0.6 ms, and the time interval $T_1$ could denote about 2 ms. A "temporal concentration factor" can be defined as $T_S/T_P$, which is in this particular example would have a value of (0.6 ms/30 µs) or 20.

During operation, a beam output by the pump temporal concentrator 216 joins the seed signal from the front end 202, and both beams are launched into the power amplifier 204. The pump and seed beams are temporally synchronized such that each pulse in the seed beam is amplified to the desired peak-power level, and extracted energy from the power amplifier 204 is at least partially restored by the optical capacitor 218 in the time interval between successive pulses 104 in a burst 102.

As a particular example of this functionality, assume that the optical pump 206 provides about 500 W of laser power at about 1470 nm for a $T_S$ period of about 600 µs. The pump temporal concentrator 216 could concentrate this laser power and output about 10 kW of laser power at about 1532 nm for a $T_P$ period of about 30 µs. This provides a concentration factor of about 20 and raises a 500 W laser power input to about 10 kW of pump power output. A seed signal containing about thirty pulses per $T_P$ period can be amplified by the power amplifier 204, which can output a beam with high peak-power pulses at about 1570 nm. In some embodiments, the optical capacitor 218 could be implemented using a high aspect ratio core (HARC) Er-doped fiber having a core of about 150 µm by about 2 mm (with an area of about 0.3 mm²) and length of about 2 m. This is sufficient for concentrating the output of a pump-diode array generating about 500 W output power at about 1470 nm into a sequence of about 30 µs pulses at about 1532 nm. Analysis demonstrates that these or other fiber dimensions can be selected so that the area and length of the fiber in the optical capacitor 218 reduce the small-signal gain to a low level (less than about 300) and reduce the ASE to a low level at the time of maximum energy storage in the optical capacitor 218. This helps to ensure that the ASE does not reach a level that seriously degrades the efficiency of the optical capacitor 218.

Note that it is not necessary for the laser beam radiated by the optical capacitor 218 to have a high beam quality. Thus, an optical fiber comprising the optical capacitor 218 need not be semi-guiding, which is usually needed for high beam quality output. The optical fiber comprising the optical capacitor 218 could instead be formed using a fully guiding rectangular-core HARC fiber, which can be relatively easy to fabricate. Also, the optical fiber comprising the optical capacitor 218 only needs to provide a beam quality comparable to that of the optical pump 206, so the fiber can be made with a very large volume and with relaxed specifications and is not bound by the same nonlinear optical length limitations associated with generating very high peak-power 1 ns pulses. The fiber core can be designed to have the same aspect ratio and etendue as the pump cladding within the power amplifier 204 so that pump power can be easily launched into a SHARC fiber of the power amplifier 204 using simple imaging lenses with no change in aspect ratio. The fiber of the optical capacitor 218 could merely emit an optical beam that has a spatial cross-sectional area and a divergence solid angle substantially matching a pumping-aperture area and an acceptance solid angle of the power amplifier 204 so that the coupling of the light from the optical capacitor 218 into the power amplifier 204 can be achieved with spherical optics. Finally, the optical fiber comprising the optical capacitor 218 can be coiled next to the fiber(s) of the power amplifier 204 in a transmitter package.

FIG. 4 illustrates an example implementation of the programmable out-coupler 304, which includes a polarization beam splitter 402, a Pockels cell 404, and a second resonator mirror 406. The polarization beam splitter 402 directs laser energy along different paths depending on the polarization of the laser energy. The Pockels cell 404 denotes a voltage-controlled wave plate that alters the polarization of the laser energy, which provides control over whether the laser energy passes through the polarization beam splitter 402 or is reflected by the polarization beam splitter 402. Note, however, that any other mechanism could be used to change the polarization of the laser energy. Note also that other optical-switching mechanisms that do not rely on polarization changes could be used instead of the Pockels cell, such as an acousto-optic modulator. The resonator mirror 406 reflects the laser energy so that the laser energy remains within the pump temporal concentrator 216 unless out-coupled via the polarization beam splitter 402.

None, some, or all of the laser energy is out-coupled by the polarization beam splitter 402 based on the operation of the Pockels cell 404. In the arrangement shown in FIG. 4, light in the optical capacitor 218 can operate in the P-polarization (in the plane of the figure). This light passes through the polarization beam splitter 402 with essentially no loss, neglecting small reflective losses and the finite extinction of the beam splitter 402. The light then passes through the Pockels cell 404 and is reflected by the second resonator mirror 406. Depending on how the Pockels cell 404 affects the polarization of the light, the polarization beam splitter 402 could divide the laser energy into an S-polarized portion that is coupled out of the pump temporal concentrator 216 (along path #1) and a P-polarized portion that is retained in the resonator (along path #2).

As a particular example of this functionality, if the Pockels cell 404 is biased with a quarter-wave voltage, double-passing a beam through the Pockels cell 404 (left-to-right and then right-to-left in FIG. 4) results in a 90° polarization rotation, substantially all of the beam is directed along path #1, and feedback into the resonator is substantially zero. If the Pockels cell 404 has zero bias or some integral multiple of a half-wave voltage, the polarization state is unchanged after the double-pass, substantially all of the beam is directed along path #2, and feedback into the resonator is substantially 100%. By controlling the voltage applied to the Pockels cell 404, the programmable out-coupler 304 can be programmed to provide an arbitrary out-coupling fraction (path #1) with any remaining light efficiently retained within the resonator (path #2).

The Pockels cell 404 therefore controls resonator losses and controls the generation of concentrated pump pulses. For example, in an "accumulation" stage, the Pockels cell 404 can be set for high resonator loss, the resonator is sub-threshold, and the optical capacitor 218 integrates the optical pump power. In an "active" stage, the Pockels cell 404 decreases loss to start controlled lasing, the feedback loop controls resonator losses, and the desired pump waveform is generated. During the active stage, energy is extracted by the power amplifier 204 for each pulse 104 prior to the arrival of the next pulse 104.

The polarization beam splitter 402 includes any suitable structure supporting beam splitting based on polarization. The Pockels cell 404 includes any suitable structure for altering the polarization of light. In some embodiments, the Pockels cell 404 includes an electro-optical (EO) crystal and a polarizer that provides sufficient extinction to preclude lasing prior to a "fire" command. A voltage applied to the EO crystal can be used to vary the polarization of at least some of the light within the out-coupler 304. Switching times are well within the capabilities of commercial devices, and the temporal duty cycle and the burst repetition rate can be low enough that acoustic resonance is not problematic. In other embodiments, the Pockels cell 404 includes an acousto-optical (AO) modulator. The second resonator mirror 406 includes any suitable structure that reflects laser energy, such as a regular mirror. The structure of the laser system shown here can be designed so that all or substantially all of the light coupled into the pump temporal concentrator 216 is used and not lost.

In some embodiments, two different control modes are applied to the optical capacitor 218. A first control mode applies during the pumping intervals between the bursts 102 and is used to help ensure that the optical capacitor 218 attains the prescribed level of stored energy and resulting amplification gain that prevents over-pumping or under-pumping at the beginning of each burst 102. A second control mode operates during the burst time intervals and is used to generate the prescribed temporal waveform for a long laser pulse radiated by the optical capacitor 218. A system controller (not shown here) responsible for synchronization of an entire system can apply the appropriate control signals to switch between the two modes at the beginning and end of each burst 102. The different control modes may or may not use different sets of available monitoring devices.

For both control modes, control could be "soft" to avoid self-oscillations of the optical-capacitor resonator, which operates near the lasing threshold. In some embodiments, for example, a single electronics loop feeding the out-coupler 304 located within the optical-capacitor resonator is employed in both the accumulation and active stages. In these embodiments, the control loop can use different algorithms regulating the transmission of the out-coupler 304, which establishes the rate at which any excessive stored energy in the optical capacitor 218 is allowed to leak out through the out-coupler 304. In other embodiments, a different control loop can be provided for the accumulation stage, and control during the active stage could occur as described above. The control loop that operates during the accumulation stage can control the electrical load on the pump diodes, instead of controlling the Pockels cell voltage, to vary a rate at which the optical capacitor 218 is pumped for stabilizing the gain at a prescribed value prior to arrival of the first pulse 104 of a burst 102.

Various benefits can be obtained by using a pump temporal concentrator 216 in a laser system as described above, although the particular benefits that can be obtained may vary depending on the implementation. For example, the pump temporal concentrator 216 can be scalable to very high average power levels, allowing the use of low-power optical pumps to generate high-power laser pulses. Also, the pump temporal concentrator 216 can generate a pump beam having substantially the same aspect ratio and etendue as the power amplifier 204, so there would be no need for cylindrical or other optics to launch the pump power into the amplifier 104. Further, the instantaneous pump power of the optical pump 206 can be modulated to provide for variable inter-pulse periods, and the pulse-burst architecture can be agnostic to amplifier architectures.

Beyond that, the programmable out-coupler 304 and the controller 306 can operate to maintain the output of the pump temporal concentrator 216 at a level that yields pulses with substantially constant amplitudes across an entire pulse burst. The programmable out-coupler 304 enables continuous real-time control of the pump temporal concentrator's out-coupling without excessive losses. Note that multiple sense points are available and can be used by the controller 306 to monitor the performance of the pump temporal concentrator

216. For example, ASE or fluorescence in the optical capacitor 218 could be measured and used to monitor the stored energy. The instantaneous output or output pulse energy of the pump temporal concentrator 216 could also be measured and used by the controller 306.

Moreover, there may be little if any penalty on overall efficiency associated with the use of the pump temporal concentrator 216. Fluorescence losses may only occur in the optical capacitor 218, while the power amplifier 204 (such as a SHARC amplifier) may have nearly quantum-limited efficiency loss (such as 2% for a 1532 nm pump wavelength and a 1570 nm signal wavelength) and therefore be very power-efficient.

The efficiency reduction in this design comes from inserting optical components of the pump temporal concentrator 216 between the optical pump 206 and the power amplifier 204. However, other design aspects offset part or all of the efficiency reduction. For example, since the cascaded laser media in the optical capacitor 218 and the power amplifier 204 are of relatively low gain, there may be little or no ASE losses. Also, fluorescence losses in the optical capacitor 218 can be controlled by ensuring that the pump time (time $T_S$) is smaller than the fluorescence lifetime of the laser gain medium. As a particular example, when the pump time is decreased from the full burst interval to ⅓ of the burst interval, fluorescence losses can decrease by at least a factor of three (note that this does result in an increase in pump power to achieve the same total stored energy, which could translate into a higher number of laser diodes). Since a SHARC power amplifier 204 can be pulsed rapidly (such as at a 1 µs interval), there may be essentially no fluorescence or ASE losses in the power amplifier 204.

Note that the geometry and doping density for a SHARC power amplifier 204 can be controlled to reduce fluorescence or ASE losses, while resonant pumping and an absence of saturation of pump absorption can enable an extraction efficiency exceeding 90%. Thus, for example, directing about 500 W of 1470 nm pump power into a HARC fiber (the optical capacitor 218) for 0.6 ms could produce about 6 kW of pump power at 1532 nm, resulting in a pump temporal concentration ratio greater than ten. The scheme described above yields an overall end-to-end optical efficiency of at least about 50%.

In addition, it is possible to fully optimize the two independent gain media (the laser medium in the power amplifier 204 and the laser medium in the optical capacitor 218) for their respective functions. As described above, one possible approach to solving the challenges associated with pulse-burst waveforms involves storing the total energy of the complete pulse burst 102 in a single power amplifier 204. However, in this approach, a single gain medium performs several independent functions that are difficult to reconcile. The single gain medium needs to amplify the seed burst waveform to a high peak-power while maintaining all output pulses with a substantially constant energy level and peak-power level. This requirement can be very difficult to meet, since each seed pulse undergoes less gain than the preceding pulse due to consistent depletion of stored energy in the gain medium (and hence a consistent reduction of the gain). In principle, this challenge can be addressed by arranging for the first seed pulse to have a relatively low pulse energy so that the high gain available for that pulse raises the peak power to the required level. Each successive pulse could be more energetic so that the lower remaining gain suffices to yield the same peak power. Unfortunately, this "pre-warp" of the seed signal can be highly challenging. The ratio of the last-to-first pulse energies in the pre-warped seed signal can rise up to nearly 60 dB. Even if the pre-warp is achieved, the gain medium also needs to yield the required gain and produce a good output beam quality. The beam quality requirement generally pushes amplifier designs toward small cross-sectional areas, while the requirement for a high stored energy to amplify all of the seed pulses forces the design toward a large area. A similar conflict arises in connection with the gain. High energy storage is difficult unless the amplifier gain is maintained at a low level, but various applications (such as LADAR systems) require a high amplifier gain to minimize the overall size of the transmitter.

With the use of the pump temporal concentrator 216 and the power amplifier 204, two independent gain media are provided, each of which performs an independent function and can therefore be fully optimized for that function. The optical capacitor 218 can have a larger cross-sectional area that is optimized to store the needed energy without significant losses due to ASE or parasitic oscillations, which can be done without affecting the gain of the power amplifier 204. In contrast, a smaller cross-sectional area of the power amplifier 204 can be optimized to obtain a required signal gain, a good beam quality, and a high extraction efficiency. As a result, the optical capacitor 218 can have a large cross-sectional area without affecting the output beam quality of the amplified seed beam, since the power amplifier 204 provides the necessary gain and beam quality independent of the optical capacitor 218. By allocating the functionality across the independent gain media, each one can be fully optimized for its respective function, and the system can produce the best overall performance. This inherent potential for optimization allows a laser system with the pump temporal concentrator 216 to operate at, near, or above the same efficiencies obtained in systems that generate a continuous pulse train.

Note that while described above as supporting the generation of pulse bursts, the pump temporal concentrator 216 can be used to support the generation of other suitable laser outputs. For example, advanced LADAR systems and other systems are considering other advanced waveforms that might be nearly as challenging as (or even more challenging than) a pulse burst format. As a particular example, a system might require a continuous wave (CW) waveform operating at a 10% duty cycle with an average power of about 200 W. Due to the low 10% duty cycle, the waveform power during the "on" state would need to be about 2 kW. This waveform poses a similar challenge as the pulse burst waveform, since the pump power is temporally modulated by an order of magnitude. The pump temporal concentrator 216 can be used with this waveform, as well as the pulsed waveform described previously. This signifies that a multi-function transmitter can maintain important capabilities even with pulsed or continuous-wave waveforms that are especially challenging due to operation at low temporal duty cycles.

It has been considered whether a pump temporal concentrator 216 with a built-in intra-cavity feedback loop would be susceptible to instabilities that could distort the desired uniform square pump pulses shown in FIG. 3B (or other output waveform). It has been determined that such instabilities are unlikely, because the sign of the feedback is negative. For example, if the instantaneous pump power extracted from the optical capacitor 218 happens to increase for some reason, the increase would reduce the remaining gain, which would tend to reduce the extraction for the following time interval. This stability arises because the pump rate into the optical capacitor 218 is negligible compared to the extraction rate of the laser power, and the dynamics are driven primarily or solely by the extraction process. In the event some degree of stabilization may be necessary, automatic feedback control can be used, which is effective in suppressing instabilities.

It has also been determined that the pump temporal concentrator 216 can be adapted so that the pump wavelength of the power amplifier 204 can be reduced, such as from about 1532 nm to about 1470 nm. This would allow the power amplifier 204 to operate with a higher gain at wavelengths closer to about 1550 nm. In this case, instead of using an Er-doped HARC fiber for the optical capacitor 218, one could use a similar Bismuth (Bi)-doped fiber. In this case, a Bi-doped fiber amplifier could be pumped by mature 1310 nm pump diodes. This type of laser can readily generate output at 1470 nm, and this laser can achieve a respectable optical efficiency of about 60% in a germano-silicate fiber host.

Although FIGS. 2 through 4 illustrate one example of a laser system 200 for generating bursts of high peak-power laser pulses or other laser outputs, various changes may be made to FIGS. 2 through 4. For example, power amplifiers, optical capacitors, and other components of the laser system 200 could be implemented in any other suitable manner. Also, the laser system 200 need not use the pulse-burst waveform 100 shown in FIG. 1. As noted above, the pump temporal concentrator 216 could be used in various systems where pump power is received over a longer period of time, stored, and released over a shorter period of time.

Figure 5:
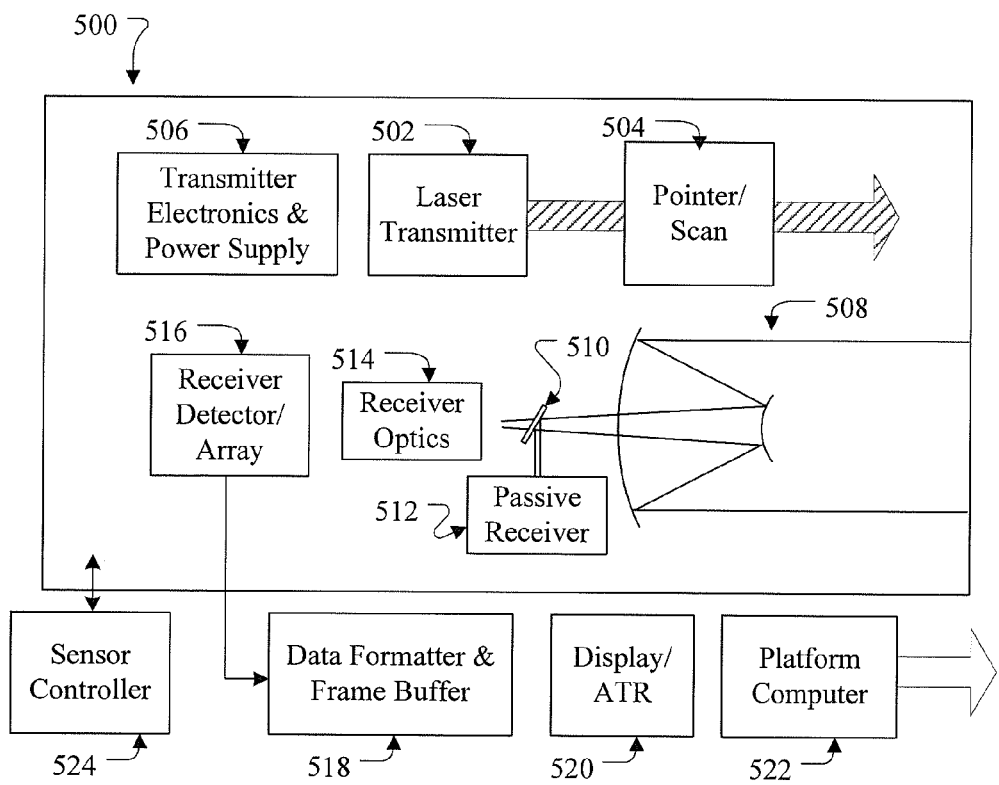
FIG. 5 illustrates an example device that uses a laser system for generating bursts of high peak-power laser pulses or other laser outputs according to this disclosure.

Laser systems having pump temporal concentrators could be used in a wide variety of applications. FIG. 5 illustrates an example device 500 that uses a laser system for generating bursts of high peak-power laser pulses or other laser outputs according to this disclosure. As shown in FIG. 5, the device 500 includes a laser transmitter 502, which represents any suitable laser system having at least one pump temporal concentrator. The laser transmitter 502 could, for example, incorporate the laser system 200 shown in FIGS. 2 through 4.

An output laser beam (which can contain bursts of rapid high peak-power pulses) from the transmitter 502 is provided to a pointer/scan unit 504, which can direct the output laser beam in desired directions. For instance, the pointer/scan unit 504 could sweep a given area with the beam in order to identify aircraft or other targets/objects of interest. Transmitter electronics and power supply unit 506 provides power and control signals to the laser transmitter 502 and the pointer/scan unit 504 in order to control the generation and steering of the output laser beam.

Laser illumination reflected from at least one object of interest can be received at the device 500 via a telescope 508, which directs the laser illumination to a splitter or steering mirror 510. The splitter or steering mirror 510 can deliver part or all of the laser illumination to a passive detector 512 and part or all of the laser illumination to receiver optics 514 that focus the laser illumination onto a receiver/detector array 516. The passive receiver 512 can engage is passive target/object detection, while the receiver/detector array 516 can support active or semi-active target/object detection.

Data from the receiver/detector array 516 can be provided to a data formatter and frame buffer 518, which formats the data in a suitable manner. A display or automatic target recognition (ATR) unit 520 displays information such as potential or acquired targets identified by the device 500 using the laser illumination. The platform computer 522 can support various functions such as data processing, target acquisition, and guidance commands for directing the device 500 towards an object. A sensor controller 524 can control various operations of the device 500, such as operations of the passive receiver 512 or the receiver/detector array 516.

Although FIG. 5 illustrates one example of a device 500 that uses a laser system for generating bursts of high peak-power laser pulses or other laser outputs, various changes may be made to FIG. 5. For example, while often described as using laser illumination for target acquisition, various other applications can use the transmission of laser illumination and the detection of reflected laser illumination. Moreover, a laser system with a pump temporal concentrator could be used in any other suitable manner.

Figure 6:
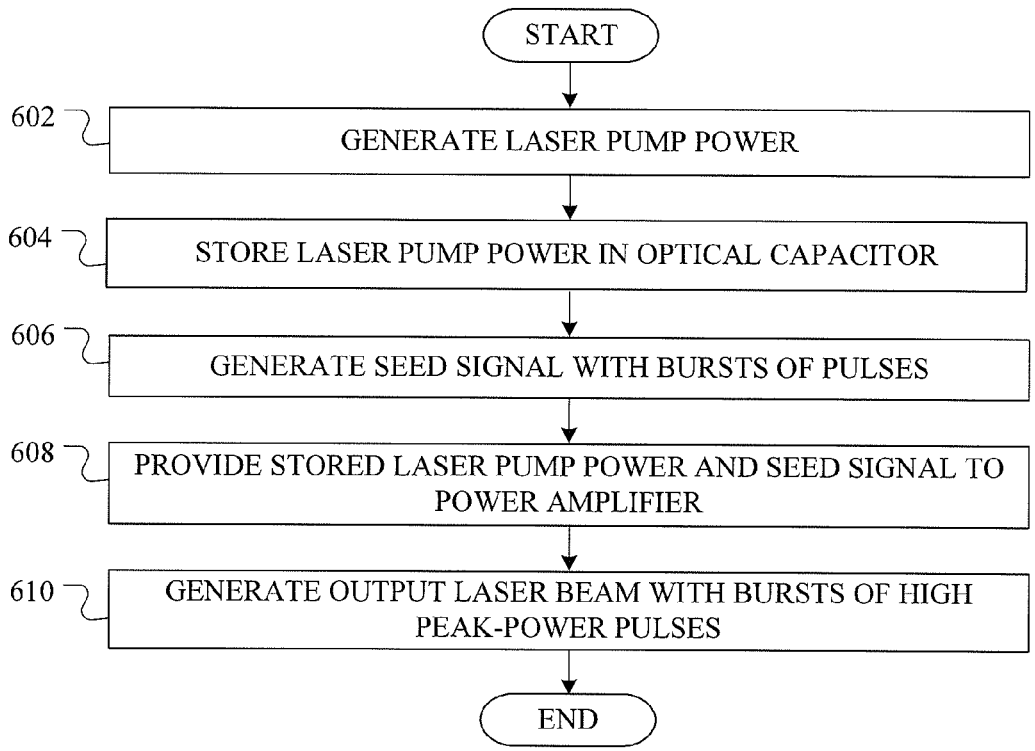
FIG. 6 illustrates an example method for generating bursts of high peak-power laser pulses according to this disclosure.

FIG. 6 illustrates an example method 600 for generating bursts of high peak-power laser pulses according to this disclosure. For ease of explanation, the method 600 is described with respect to the laser system 200 including the pump temporal concentrator 216. The method 600 could be used by any suitable laser system having any suitable pump temporal concentrator.

As shown in FIG. 6, laser pump power is generated at step 602. This could include, for example, the optical pump 206 generating pump power at one or more wavelengths, such as at a nominal wavelength of about 1470 nm. The pump power is stored in an optical capacitor at step 604. This could include, for example, the pump power being provided to the optical capacitor 218 and the resonator formed using the mirrors 302 and 406. The Pockels cell 404 can be configured at this point so that the polarization beam splitter 402 allows passage of the laser power between the mirrors 302 and 406. The storage of pump power could occur for any length of time, such as for about 0.6 ms of each 2 ms interval.

A seed signal containing bursts of pulses is generated at step 606. This could include, for example, the front end 202 generating a seed signal containing low-power pulses. The low-power pulses could, for example, represent pulses having a duration of about 1 ns and an interval of about 1 μs.

The stored laser pump power and the seed signal are provided to a power amplifier at step 608. This could include, for example, the pump temporal concentrator 216 out-coupling the stored laser power to the power amplifier 204. This could occur by configuring the Pockels cell 404 to alter the polarization of light so that the polarization beam splitter 402 out-couples the laser power to the power amplifier 204. An output laser beam with bursts of high peak-power pulses is generated at step 610. This could include, for example, the power amplifier 204 generating pulses having a duration of about 1 ns, a power level of about 5 mJ to about 10 mJ per pulse, and a pulse repetition frequency of about 1 MHz. The pump and seed are temporally synchronized in the power amplifier 204 so that each pulse in the seed signal is amplified to a desired peak-power level. During this time, the optical capacitor 218 and the pump temporal concentrator 216 pump the power amplifier 204 in order to replace energy extracted from the power amplifier 204 by a single pulse 104 prior to the next pulse 104. As a result, each pulse 104 in the burst 102 could have substantial equal power levels. The method 600 could be repeated any number of times to generate multiple bursts of pulses in the output laser beam.

Although FIG. 6 illustrates one example of a method 600 for generating bursts of high peak-power laser pulses, various changes may be made to FIG. 6. For example, while shown as a series of steps, various steps in each figure could overlap, occur in parallel, occur in a different order, or occur any number of times.

Figure 7:
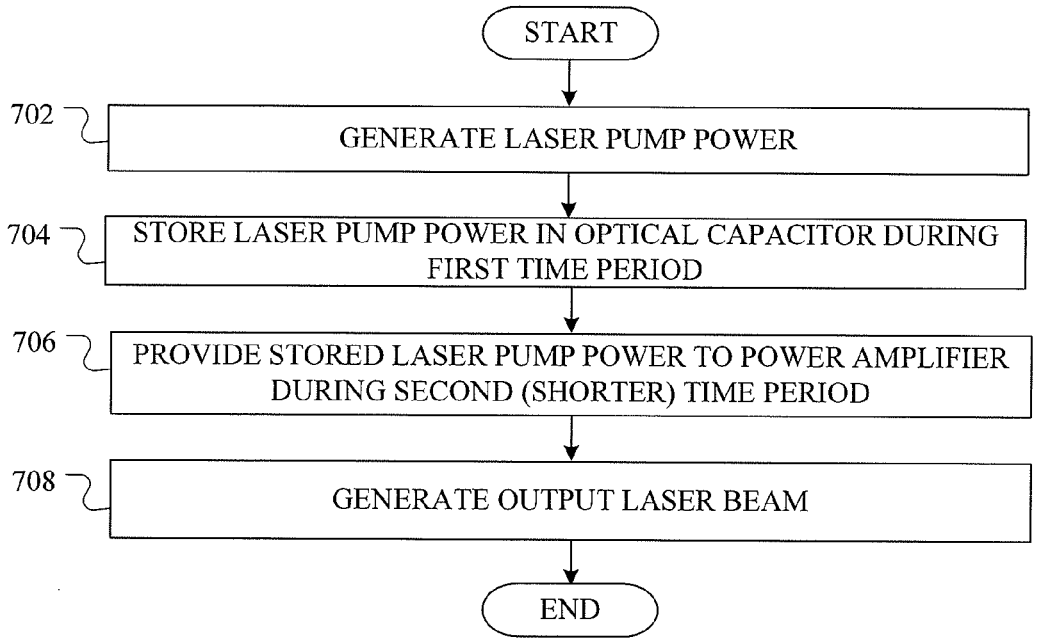
FIG. 7 illustrates an example method for generating a laser output using stored optical pump power according to this disclosure.

Note that while FIG. 6 illustrates the generation of bursts of high peak-power pulses, a pump temporal concentrator 216 could be used to generate other waveforms as noted above. FIG. 7 illustrates an example method 700 for generating a laser output using stored optical pump power according to this disclosure. The method 700 is more generalized in that it can involve (but does not require) the generation of bursts of high peak-power pulses.

As shown in FIG. 7, laser pump power is generated at step 702, and the pump power is stored in an optical capacitor during a first period of time at step 704. This could include, for example, the optical pump 206 generating pump power at one or more wavelengths, such as at a nominal wavelength of about 1470 nm. This could also include the pump power being provided to the optical capacitor 218 and the resonator formed using the mirrors 302 and 406. The Pockels cell 404 can be configured at this point so that the polarization beam splitter 402 allows passage of the laser power between the mirrors 302 and 406. The storage of pump power could occur for any length of time, such as for about 0.6 ms of each 2 ms interval.

The stored pump power is provided to a power amplifier during a second period of time at step 706. This could include, for example, the pump temporal concentrator 216 out-coupling the stored laser power to the power amplifier 204. This could occur by configuring the Pockels cell 404 to alter the polarization of light so that the polarization beam splitter 402 returns a fraction of the initial light emitted by the optical capacitor 218 back to the optical capacitor 218, thereby initiating oscillation in the resonator established by the mirrors 302 and 406. The laser power generated in the resonator that is not returned to the resonator is deflected out of the resonator by polarizing beam splitter, and at least some of the laser power couples to the power amplifier 204. An output laser beam is generated at step 708. This could include, for example, the power amplifier 204 generating any suitable output laser beam using the pump power received from the pump temporal concentrator 216.

Note that the method 700 could be repeated continuously or intermittently to generate a continuous or intermittent laser output. Also note that the second period of time here is shorter than the first period of time, so the power provided to the power amplifier 204 could be at a much higher level compared to the power level output by the optical pump 206. As noted above, for instance, a 500 W output from the optical pump 206 could be converted into a 10 kW or 20 kW output from the pump temporal concentrator 216. In addition, note that the first and second periods of time may or may not overlap.

Although FIG. 7 illustrates one example of a method 700 for generating a laser output using stored optical pump power, various changes may be made to FIG. 7. For example, while shown as a series of steps, various steps in each figure could overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
accumulating optical pump power in a first laser gain medium during a first period of time, the first laser gain medium optically located within a resonator;
providing at least some of the accumulated optical pump power as a first laser output with a feedback-controlled waveform from the first laser gain medium to a second laser gain medium during a second period of time, the second period of time substantially shorter than the first period of time; and
generating a second laser output comprising a burst of laser pulses using the second laser gain medium as a power amplifier, wherein the first and second laser outputs have higher power levels during the second period of time compared to a power level of the optical pump power during the first period of time.

2. The method of claim 1, wherein accumulating the optical pump power in the first laser gain medium and providing at least some of the accumulated optical pump power from the first laser gain medium to the second laser gain medium comprise:
controlling a polarization of light within the resonator so that at least some of the light having a first polarization travels back and forth within the resonator and at least some of the light having a second polarization is out-coupled to the second laser gain medium.

3. The method of claim 2, wherein controlling the polarization of the light comprises varying a voltage applied to an electro-optical (EO) crystal within the resonator, the EO crystal configured to vary the polarization of the light.

4. The method of claim 1, wherein:
the first laser gain medium is designed to accumulate a predefined amount of optical pump power as arranged by a feedback-controlled loop; and
the second laser gain medium is designed to generate the second laser output having a predefined signal gain, a predefined beam quality, and a predefined power-amplifier extraction efficiency.

5. The method of claim 1, wherein:
the first laser gain medium is optimized for conversion of the lower power level of the optical pump power into the higher power level of the first laser output;
an area and a length of the first laser gain medium are selected to reduce a small-signal gain and amplified spontaneous emissions (ASE) of the first laser gain medium; and
a duration of the first period of time is shorter than a time interval separating consecutive bursts of laser pulses in the second laser output.

6. The method of claim 1, wherein:
the second laser output comprises multiple bursts of laser pulses;
the accumulating, providing, and generating operations are performed for each burst; and
a total duration of the first laser output from the first laser gain medium during each burst of laser pulses substantially matches a total duration of the respective burst of laser pulses.

7. The method of claim 1, wherein providing at least some of the accumulated optical pump power from the first laser gain medium to the second laser gain medium comprises:
during an inter-pulse period between two consecutive laser pulses in the burst, replacing at least some energy extracted from the second laser gain medium by a first of the two consecutive laser pulses prior to generation of a second of the two consecutive laser pulses.

8. The method of claim 1, wherein:
the second laser output comprises multiple bursts of laser pulses;
the method further comprises generating a seed signal comprising a lower-power version of the second laser output and providing the seed signal to the second laser gain medium; and
the bursts of laser pulses in the second laser output correspond to bursts of pulses in the seed signal.

9. The method of claim 1, wherein:
the second laser output comprises multiple bursts of laser pulses;
the waveform of the first laser output is kept substantially constant during the bursts using a feedback-controlled loop; and
the laser pulses in the bursts have substantially constant amplitudes.

10. The method of claim 1, wherein:
the second laser output comprises multiple bursts of laser pulses;
the waveform of the first laser output is controlled using a feedback-controlled loop to alter an interval between or energy level of individual pulses in the bursts; and
the pulses in the bursts are encoded according to a predetermined protocol.

11. An apparatus comprising:
a pump temporal concentrator comprising a first laser gain medium optically located within a resonator, the first laser gain medium configured to accumulate optical pump power during a first period of time; and
a power amplifier comprising a second laser gain medium;
wherein the pump temporal concentrator is configured to provide at least some of the accumulated optical pump power as a first laser output with a feedback-controlled waveform from the first laser gain medium to the second laser gain medium during a second period of time that is substantially shorter than the first period of time; and
wherein the power amplifier is configured to generate a second laser output comprising a burst of laser pulses, wherein the first and second laser outputs have higher power levels during the second period of time compared to a power level of the optical pump power during the first period of time.

12. The apparatus of claim 11, wherein the pump temporal concentrator further comprises:
a programmable out-coupler configured to selectively provide the accumulated optical pump power from the first laser gain medium to the second laser gain medium; and
a feedback loop configured to control the pump temporal concentrator in order to accumulate a predefined amount of optical pump power in the first laser gain medium.

13. The apparatus of claim 12, wherein:
the programmable out-coupler comprises a polarization beam splitter configured to direct light based on polarization and a Pockels cell configured to adjust the polarization of the light; and
the programmable out-coupler is configured to allow at least some of the light having a first polarization to travel back and forth within the resonator and to out-couple at least some of the light having a second polarization to the second laser gain medium.

14. The apparatus of claim 11, further comprising:
a controller configured to control operation of the apparatus in order to obtain a specified output power waveform from at least one of the laser gain mediums.

15. The apparatus of claim 11, wherein:
the second laser gain medium is configured to generate the second laser output having multiple bursts of laser pulses; and
the apparatus further comprises a controller configured to control operation of the apparatus in order to obtain a specified temporal pattern of the pulses in the bursts.

16. The apparatus of claim 11, wherein:
the second laser gain medium is configured to generate the second laser output having multiple bursts of laser pulses with consecutive bursts separated by a time interval;
the pump temporal concentrator and the second laser gain medium are configured to perform the accumulating, providing, and generating operations for each burst; and
the first period of time is less than the time interval.

17. The apparatus of claim 11, wherein the pump temporal concentrator is configured, during an inter-pulse period between two consecutive laser pulses in the burst, to replace at least some energy extracted from the second laser gain medium by a first of the two consecutive laser pulses prior to generation of a second of the two consecutive laser pulses.

18. The apparatus of claim 11, wherein the first laser gain medium is configured to emit an optical beam that has a spatial cross-sectional area and a divergence solid angle substantially matching a pumping-aperture area and an acceptance solid angle of the second laser gain medium.

19. The apparatus of claim 11, further comprising:
a front end configured to generate a seed signal comprising a lower-power version of the second laser output and to provide the seed signal to the second laser gain medium.

20. A system comprising:
a laser transmitter comprising:
an optical pump configured to generate optical pump power;
a pump temporal concentrator comprising a first laser gain medium optically located within a resonator, the first laser gain medium configured to accumulate the optical pump power during a first period of time; and
a power amplifier comprising a second laser gain medium;
wherein the pump temporal concentrator is configured to provide at least some of the accumulated optical pump power as a first laser output with a feedback-controlled waveform from the first laser gain medium to the second laser gain medium during a second period of time that is substantially shorter than the first period of time; and
wherein the power amplifier is configured to generate a second laser output comprising a burst of laser pulses, wherein the first and second laser outputs have higher power levels during the second period of time compared to a power level of the optical pump power during the first period of time.

21. The system of claim 20, further comprising:
a pointer or scanner configured to direct the second laser output in one or more directions.

22. The system of claim 21, further comprising:
a receiver configured to receive a portion of the second laser output reflected from at least one object.

23. The system of claim 20, wherein the pump temporal concentrator is configured, during an inter-pulse period between two consecutive laser pulses in the burst, to replace at least some energy extracted from the second laser gain medium by a first of the two consecutive laser pulses prior to generation of a second of the two consecutive laser pulses.

* * * * *